United States Patent
Abe et al.

[11] Patent Number: 6,122,431
[45] Date of Patent: Sep. 19, 2000

[54] OPTICAL TRANSMISSION MEMBER

[75] Inventors: Tomiya Abe; Yoshikazu Hayakawa; Masanori Matsumoto; Kouki Hirano; Fumitaka Nakahigashi, all of Ibaraki, Japan

[73] Assignee: Hitachi Cable, Ltd., Tokyo, Japan

[21] Appl. No.: 09/157,095

[22] Filed: Sep. 18, 1998

[30] Foreign Application Priority Data

Sep. 19, 1997 [JP] Japan ................................. 9-254565
Sep. 16, 1998 [JP] Japan ................................ 10-260779

[51] Int. Cl.[7] ....................................................... G02B 6/00
[52] U.S. Cl. ........................................... 385/145; 385/141
[58] Field of Search ................................... 385/141, 142, 385/143, 144, 145

[56] References Cited

U.S. PATENT DOCUMENTS 5,790,742  8/1998  Tsubaki et al. ........................ 385/144

FOREIGN PATENT DOCUMENTS 62-287207  12/1987  Japan .
2-195302    8/1990  Japan .
3-68904     3/1991  Japan .

Primary Examiner—Phan T. H. Palmer
Attorney, Agent, or Firm—McDermott, Will & Emery

[57] ABSTRACT

An optical transmission member comprising a core and a clad provided on the core is provided, wherein the core consists of silicon rubber and the clad consists of tetrafluoroethylene/hexafluoropropylene/fluorovinylidene copolymer cross-linked by electron-beam, whereby an optical transmission member having improved transmission characteristics, heat resistance, flexibility and strength against buckling is provided.

8 Claims, 1 Drawing Sheet

1 — CORE OF SILICON RUBBER

2 — CLAD OF ELECTRON-BEAM CROSS-LINKED TFE/HFP/FVN

OPTICAL TRANSMISSION MEMBER

FIELD OF THE INVENTION

This invention relates to an optical power transmission member, and more particularly to a synthetic polymer optical transmission member having improved flexibility, buckling resistance and heat resistance.

Optical transmission members include quartz optical fibers and synthetic polymer optical fibers.

Quartz optical fibers are widely used for long range optical transmission member, optical transmission member for optical devices and so on, because of the improved characteristics in optical transmission. But quartz optical fibers have disadvantages in flexibility, handling versatility, cost and so on.

Synthetic polymer optical fibers are excellent in flexibility and handling facility in spite of some optical transmission loss and narrow band width in optical transmission. Another advantage of synthetic polymer optical fiber is its lower price than quartz optical fiber. Therefore, use of synthetic polymer optical fibers is extended to short range optical communication, ornament, illumination and so on.

Most of synthetic polymer optical transmission members adapted for these uses are composed of synthetic polymer core consisting of poly(methylmethacrylate) resin having excellent transparency, other optical transmission characteristics and manufacturing facility, and covered with a clad of thin layer composed of fluoro carbon resin including poly(tetrafluoroethylene), tetrafluoroethylene/hexafluoropropylene copolymers, ethylene/tetrafluoroethylene copolymers, perfluoroalkyl/vinylether copolymers.

A synthetic polymer optical transmission member composed of synthetic polymer core consisting of poly(methylmethacrylate) resin and covered with a clad of thin layer composed of fluoro carbon resin has a flexibility superior to a quartz optical fiber, but is not so soft as rubbers, because either poly(methylmethacrylate) resin used for the core or fluoro carbon resins used for the clad is essentially a hard plastic material. Particularly, a synthetic polymer optical transmission member having a core of 3 mm or more in diameter adapted for illumination, ornament and so on is poor in flexibility and thus facility in handling. In addition, the transmission loss tends to increase by bending it. In contrast, a synthetic polymer optical transmission member having a core composed of rubber, particularly, of silicon rubber, is excellent in flexibility and bending behavior. A core composed of silicon rubber provides optical transmission member having improved heat resistance, in addition to flexibility and bending behavior.

Another optical transmission member is a liquid-filled optical transmission member. But this requires liquid injection and tends to buckle upon bending due to lack of rigidity in the core.

SUMMARY OF THE INVENTION

Accordingly, it is an object of the invention to provide an optical transmission member having improved flexibility, strength against buckling and heat resistance.

According to the invention, an optical transmission member comprises:

a core comprising silicon rubber, and a clad comprising tetra-fluoroethylene/hexafluoropropylene/fluoro-vinylidene three-component copolymer, the clad being provided around the core.

It is preferred that the core is 3 mm or more but not greater than 30 mm in diameter, because a core having diameter of 3 mm or more brings about a significant difference in flexibility from a conventional optical transmission member composed of synthetic polymer core consisting of methyl-metahcrylate resin and covered with a clad of thin layer composed of fluoro carbon resin. If the outer diameter of core is increased above 30 mm, the bending behavior is impaired remarkably, as the thickness of covering also becomes greater.

A silicon rubber of 10 to 60 in JIS-A hardness is preferable for the core of optical transmission member according to the invention. Those having JIS-A hardness of less than 10 are too soft to be bent as the core tends to buckle upon bending. To the contrary, those having JIS-A hardness of above 60 are too hard for the core to be bent.

Tetrafluoroethylene/hexafluoropropylene/fluorovinylidene(TFE/H FP/FVN, hereinbelow) three-component copolymer used for the clad according to the invention having the following composition of monomers is preferable in view of flexibility and forming characteristics of the optical transmission member:

tetrafluoroethylene 10 to 70 wieight % (T)
hexafluoropropylene 10 to 70 wieight % (H)
fluorovinylidene 10 to 70 wieight % (M)

$(T+H+M=100)$

The copolymer is preferably formed by three-dimentional cross-linking, whereby heat resistance is improved in addition to flexibility.

A method for cross-linking of the copolymer is heat cross-linking consisting of heating the copolymer subsequent to addition of cross-linkable monomers, cross-linking agents, cross-linking accelerator and so on. This method for cross-linking is liable to impair the optical characteristics of the copolymer due to the presence of cross-linkable monomers, cross-linking agents, cross-linking accelerator and others.

In contrast, electron-beam cross-linking is carried out without addition of other cross-linkable monomers, cross-linking agents, cross-linking accelerator, or in the presence thereof in very small amount, thus, the three-component copolymer is free from harmful effects on the optical characteristics. Thus electron-beam cross-linking is preferable for cross-linking of the copolymer.

An optical transmission member according to the invention preferably comprises a core of 3 mm to 30 mm in diameter and a clad provided around the core, wherein the core comprises a silicon rubber having ASTM-D790 bending elasticity of from 0.2 MPa to 5 MPa and the clad comprises a TFE/HFP/FVN copolymer having ASTM-D790 bending elasticity of from 20 MPa to 200 MPa.

If a silicon rubber having ASTM-D790 bending elasticity of less than 0.2 MPa is used, the core tends to buckle upon bending of the optical transmission member. To the contrary, those having ASTM-D790 bending elasticity above 5 MPa are too hard for the core to be bent, thereby the flexibility of the transmission member is lowered. ASTM-D790 bending elasticity of a silicon rubber from 0.5 MPa to 2.5 MPa is particularly preferred.

An optical transmission member with TFE/HFP/FVN copolymer having ASTM-D790 bending elasticity less than 20 MPa is so soft that the transmission member is deformed by a small force, causing variation in the intensity of transmitting light or increase of transmission loss with a slight bending, that is, resulting in instability of optical transmission characteristics. Those having elasticity above 200 MPa are too hard for the clad, lowering the flexibility of the transmission member. ASTM-D790 bending elasticity of from 50 MPa to 180 MPa is particularly preferred for the copolymer in the clad.

Meanwhile, an optical transmission member according to the invention may be covered by an outer layer of another flexible material, for example, a black mixture of vinyl chloride resin.

BRIEF DESCRIPTION OF THE DRAWINGS

The invention will be explained in more detail in conjunction with appended drawings, wherein.

DESCRIPTION OF THE PREFERRED EMBODIMENTS

Figure 1:
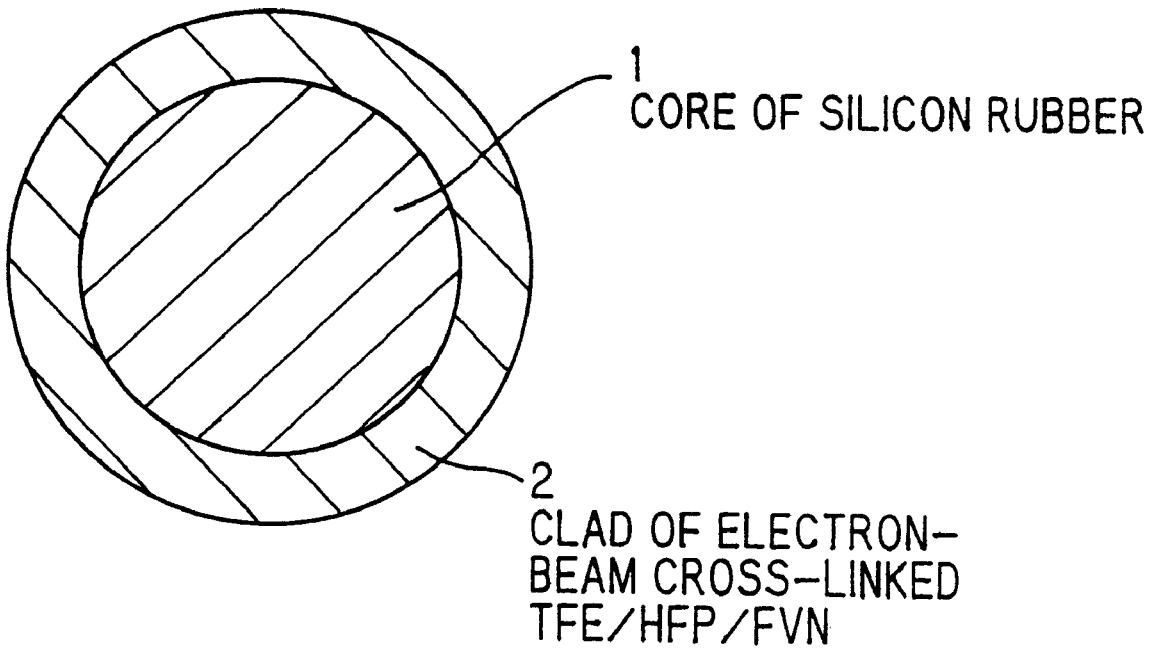
FIG. 1 shows a cross-sectional view of a preferred embodiment of optical transmission member according to the present invention.

A preferred embodiment of optical transmission member according to the invention will be explained in comparison to a conventional optical transmission member.

EXAMPLE 1

TFE/HFP/FVN copolymer containing 40 weight % of tetrafluoroethylene, 20 weight % of hexafluoropropylene and 40 weight % of fluorovinylidene is introduced into a molding machine and formed into a tube by extrusion under hot-melting. A tube of 7 mm in inner diameter and 8.5 mm in outer diameter consisting of TFE/HFP/FVN copolymer is obtained for preparing the clad. The clad tube obtained is found to have refractive index of 1.364 at 25° C. and ASTM-D790 bending elasticity of 56 MPa.

Then, the clad tube obtained is passed through an electron-beam cross-linking machine for cross-linking of the copolymer. Thereby, the clad tube is found to have such a heat resistance that no melting occurs at 180° C.

Then, phenyl-modified dimethylsiloxane silicon-rubber precursor is injected from an end of the clad tube of the cross-linked polymer. After the opposite end of the clad tube is sealed, the clad tube is immersed in an oil bath of 120° C. for one hour with the core precursor pressurized from one end of the tube for primary hardening. Further by aging in an air bath for 7 hours at 150° C., the core precursor is subjected to secondary-hardening by heat polymerization, in order to form a silicon rubber core. Silicon rubber thus prepared is found to have refractive index of 1.511 at 25° C., JIS-A hardness of 26 and ASTM-D790 bending elasticity of 0.8 MPa.

FIG. 1 shows a cross-sectional view of the optical transmission member thus obtained in this example. In FIG. 1, 1 represents a core of silicon rubber, and 2 represents a clad consisting of electron-beam cross-linked TFE/HFP/FVN.

The characteristics of the optical transmission member obtained is shown in the following:

optical transmission loss at wavelength of 660 nm: 0.5 dB/m increment of loss after heating at 120° C. for 1000 hours: 0.3 dB/m weight resulting in deformation of 10 mm relative to 100 mm of length: 15 g minimum winding diameter free from buckling: 30 mm As shown above, the optical transmission member obtained in the example provides good results in transmission characteristics, heat resistance, flexibility and strength against buckling.

EXAMPLE 2

An optical transmission member is prepared under the conditions similar to Example 1 except that electron-beam cross-linked TFE/HFP/FVN copolymer having monomer composition of 60 weight % of tetrafluoroethylene, weight % of hexafluoropropylene and 20 weight % of fluorovinylidene is used for clad 2. The clad tube obtained is found to have refractive index of 1.359 at 25° C. and ASTM-D790 bending elasticity of 176 Mpa, as well as such an excellent heat resistance that no melting occurs at 180° C.

The characteristics of the optical transmission member obtained is shown in the following:

optical transmission loss at wavelength of 660 nm: 0.4 dB/m increment of loss after heating at 120° C. for 1000 hours: 0.2 dB/m weight resulting in deformation of 10 mm relative to 100 mm of length: 150 g minimum winding diameter free from buckling: 30 mm As shown above, the optical transmission member obtained provides good results in transmission characteristics, heat resistance, flexibility and strength against buckling.

EXAMPLE 3

An optical transmission member is prepared under the conditions similar to Example 1 except that a tube of 9 mm in inner diameter and 10.5 mm in outer diameter consisting of TFE/HFP/FVN copolymer is used for preparing the clad.

The characteristics of the optical transmission member obtained is shown in the following:

optical transmission loss at wavelength of 660 nm: 0.5 dB/m increment of loss after heating at 120° C. for 1000 hours: 0.3 dB/m weight resulting in deformation of 10 mm relative to 100 mm of length: 25 g minimum winding diameter free from buckling: 40 mm As shown above, the optical transmission member obtained provides good results in transmission characteristics, heat resistance, flexibility and strength against buckling.

EXAMPLE 4

An optical transmission member is prepared in a manner similar to Example 1 except the process for preparation of silicon rubber core as mentioned in the following. A silicon rubber core is prepared by injection of phenyl-modified dimethylsiloxane silicon-rubber precursor from an end of the clad tube of TFE/HFP/FVN copolymer and immersion of the clad tube with the opposite end sealed in an oil bath at a temperature of 110° C. for 50 hours with pressure applied to the precursor from the open end of the tube, for heat polymerization by single step.

The silicon rubber for the core is found to have refractive index of 1.511 at 25° C., JIS-A hardness of 50 and ASTM-D790 bending elasticity of 2.1 MPa.

The characteristics of the optical transmission member obtained is as follows:

optical transmission loss at wavelength of 660 nm: 0.5 dB/m increment of loss after heating at 120° C. for 1000 hours: 0.2 dB/m weight resulting in deformation of 10 mm relative to 100 mm of length: 25 g minimum winding diameter free from buckling: 25 mm As shown above, the optical transmission member obtained provides good results in transmission characteristics, heat resistance, flexibility and strength against buckling.

EXAMPLE 5

A tube of 11 mm in inner diameter and 13 mm in outer diameter consisting of TFE/HFP/FVN copolymer similar to Example 1 is used for preparing the clad. A silicon rubber core is formed in the process similar to Example 4 by injection of silicon- rubber precursor into the clad tube of TFE/HFP/FVN copolymer and immersion of the clad tube in a hot oil bath.

The silicon rubber for the core is found to have refractive index of 1.511 at 25° C., JIS-A hardness of 55 and ASTM-D790 bending elasticity of 2.2 MPa.

The characteristics of the optical transmission member obtained is as follows:

optical transmission loss at wavelength of 660 nm: 0.6 dB/m increment of loss after heating at 120° C. for 1000 hours: 0.2 dB/m weight resulting in deformation of 10 mm relative to 100 mm of length: 120 g minimum winding diameter free from buckling: 50 mm As shown above, the optical transmission member obtained provides good results in transmission characteristics, heat resistance, flexibility and strength against buckling.

EXAMPLE 6

A clad tube of electron-beam cross-linked TFE/HFP/FVN copolymer is prepared under the conditions similar to Example 1 except that a tube of 5 mm in inner diameter and 6 mm in outer diameter consisting of TFE/HFP/FVN copolymer is used for preparing the clad.

A silicon rubber core is formed in the process similar to Example 4 by injection of silicon-rubber precursor into the clad tube of TFE/HFP/FVN copolymer and immersion of the clad tube in a hot oil bath. The silicon rubber for the core is found to have refractive index of 1.511 at 25° C., JIS-A hardness of 55 and ASTM-D790 bending elasticity of 2.2 MPa, similar to those in Example 5.

The characteristics of the optical transmission member obtained is as follows:

optical transmission loss at wavelength of 660 nm: 0.4 dB/m increment of loss after heating at 120° C. for 1000 hours: 0.3 dB/m weight resulting in deformation of 10 mm relative to 100 mm of length: 10 g minimum winding diameter free from buckling: 20 mm As shown above, the optical transmission member obtained provides good results in transmission characteristics, heat resistance, flexibility and strength against buckling.

Comparison example

Tetrafluoroethylene/hexafluoropropylene two-component copolymer is introduced into a molding machine and formed into a tube by extrusion under hot-melting. A tube of 7 mm in inner diameter and 8.5 mm in outer diameter consisting of tetrafluoroethylene/hexafluoro-propylene copolymer without cross-linking is obtained for preparing the clad. The clad tube obtained is found to have refractive index of 1.338 at 25° C. and ASTM-D790 bending elasticity of 550 MPa.

A silicon rubber core is formed in the process similar to Example 1 in the clad tube thus obtained. The characteristics of the optical transmission member obtained is as follows:

optical transmission loss at wavelength of 660 nm: 0.4 dB/m increment of loss after heating at 120° C. for 1000 hours: 0.5 dB/m weight resulting in deformation of 10 mm relative to 100 mm of length: 500 g minimum winding diameter free from buckling: 50 mm As shown above, the optical transmission member obtained shows greater increase of transmission loss after heating for 1000 hours at 120° C. though the transmission loss prior to heating is small. The weight resulting in deformation of 10 mm relative to 100 mm of length is as much as 500 g, that is, the optical transmission member is poor in flexibility.

EXAMPLE 7

An optical transmission member is prepared in a manner similar to Example 1 except that JIS-A hardness of the silicon rubber core is as low as 8 and ASTM-D790 bending elasticity is 0.15 MPa.

The characteristics of the optical transmission member obtained is as follows:

optical transmission loss at wavelength of 660 nm: 0.4 dB/m increment of loss after heating at 120° C. for 1000 hours: 0.3 dB/m weight resulting in deformation of 10 mm relative to 100 mm of length: 10 g minimum winding diameter free from buckling: 150 mm As shown above, the optical transmission member obtained provides good results in transmission characteristics and heat resistance. Flexibility is good enough in spite of minimum winding diameter free from buckling as much as 150 mm.

EXAMPLE 8

An optical transmission member is prepared in a manner similar to Example 1 except that JIS-A hardness of the silicon rubber core is as high as 75 and ASTM-D790 bending elasticity is 4.0 MPa.

The characteristics of the optical transmission member obtained is as follows:

optical transmission loss at wavelength of 660 nm: 0.5 dB/m increment of loss after heating at 120° C. for 1000 hours: 0.3 dB/m weight resulting in deformation of 10 mm relative to 100 mm of length: 300 g minimum winding diameter free from buckling: 30 mm As shown above, the optical transmission member obtained provides good results in transmission characteristics, heat resistance and strength against buckling compared with comparison example, in spite of slightly lower flexibility.

EXAMPLE 9

An optical transmission member is prepared in a manner similar to Example 1 except that a tube of 35 mm in inner diameter and 37 mm in outer diameter is used for preparing the clad.

The characteristics of the optical transmission member obtained is as follows:

- optical transmission loss at wavelength of 660 nm: 0.3 dB/m
- increment of loss after heating at 120° C. for 1000 hours: 0.2 dB/m
- weight resulting in deformation of 10 mm relative to 100 mm of length: 200 g
- minimum winding diameter free from buckling: 300 mm As shown above, the optical transmission member obtained provides good results in transmission characteristics and heat resistance. The flexibility is good enough in spite of the core diameter not less than 30 mm.

Though electron-beam cross-linked TFE/HFP/FVN three-component copolymers are used for the clad tubes in Examples 2 to 9 above, a copolymer without cross-linking is advantageous in reduced cost, particularly in cases where high heat resistance is not required. In fact, when TFE/HFP/FVN copolymers free from cross-linking are used for the clad tubes in Examples 2 to 9, characteristics of the optical transmission members obtained are acceptable except some deformation at 180° C. due to partial melting.

The optical transmission member according to the invention is excellent in transmission characteristics, heat resistance, flexibility and strength against buckling, thereby it is useful in industry.

As this invention may be embodied in several forms without departing from the spirit of essential characteristics thereof, the present embodiment is therefore illustrative and not restrictive, since the scope of the invention is defined by the appended claims rather than by the description proceeding them, and all changes that fall within meets and bounds of the claims, or equivalence of such meets and bounds are therefore intended to be embraced by the claims.

What is claimed is:

1. An optical transmission member, comprising:

a core comprising silicon rubber; and a clad comprising tetrafluoroethylene/hexafluoropropylene/fluoro-vinylidene three-component copolymer, said clad being provided around the core.

2. An optical transmission member as defined in claim 1, wherein:

said core is not less than 3 mm but not greater than 30 mm in diameter.

3. An optical transmission member as defined in claim 1, wherein:

said core comprises silicon rubber of 10 to 60 in JIS-A hardness.

4. An optical transmission member as defined in claim 1, wherein:

said clad comprises tetrafluoroethylene/hexafluoropropylene/fluorovinylidene three-component copolymer having monomer composition of 10 to 70 weight % of tetrafluoroethylene, 10 to 70 weight % of hexafluoro-propylene and 10 to 70 weight % of fluorovinylidene, 100% in total.

5. An optical transmission member as defined in claim 4, wherein:

said copolymer is three-dimensionally cross-linked by means of electron-beam cross-linking.

6. An optical transmission member as defined in claim 1, wherein:

said core has a diameter of 3 mm to 30 mm and comprises a silicon rubber having ASTM-D790 bending elasticity of from 0.2 MPa to 5 MPa; and said clad comprises a tetrafluoroethylene/hexafluoropropylene/fluorovinylidene copolymer having ASTM-D790 bending elasticity of from 20 MPa to 200 MPa.

7. An optical transmission member, comprising:

a core of not less than 3 mm but not greater than 30 mm in diameter; and a clad provided around said core, wherein:

said core comprises silicon rubber having ASTM-D790 bending elasticity of from 0.2 MPa to 5 MPa; and said clad comprises a tetrafluoroethylene/hexafluoropropylene/fluorovinylidene copolymer having ASTM-D790 bending elasticity of from 20 MPa to 200 MPa.

8. An optical transmission member as defined in claim 7, wherein:

said copolymer is cross-linked by electron-beam cross-linking.

* * * * *